US008569196B2

(12) United States Patent
Schwab et al.

(10) Patent No.: US 8,569,196 B2
(45) Date of Patent: Oct. 29, 2013

(54) PROCESS FOR THE CONTINUOUS PRODUCTION OF A CATALYST

(75) Inventors: Ekkehard Schwab, Neustadt (DE); Stefan Kotrel, Bedminster, NJ (US); Alexander Panchenko, Ludwigshafen (DE); Sigmar Braeuninger, Hemsbach (DE); Sandra Magnus, Plankstadt (DE); Claudia Querner, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 266 days.

(21) Appl. No.: 13/061,040

(22) PCT Filed: Aug. 19, 2009

(86) PCT No.: PCT/EP2009/060710
§ 371 (c)(1),
(2), (4) Date: Feb. 25, 2011

(87) PCT Pub. No.: WO2010/026046
PCT Pub. Date: Mar. 11, 2010

(65) Prior Publication Data
US 2011/0177938 A1 Jul. 21, 2011

(30) Foreign Application Priority Data
Aug. 26, 2008 (EP) .................................... 08163000

(51) Int. Cl.
*B01J 21/18* (2006.01)
*B01J 23/40* (2006.01)
*B01J 23/74* (2006.01)
*C22C 5/04* (2006.01)
*C22C 19/03* (2006.01)
*C22C 19/07* (2006.01)

(52) U.S. Cl.
USPC ........... 502/185; 422/435; 422/441; 422/456; 422/463; 422/465; 422/466; 422/468

(58) Field of Classification Search
USPC .......... 502/185; 420/435, 441, 456, 463, 465, 420/466, 468
See application file for complete search history.

(56) References Cited

U.S. PATENT DOCUMENTS

| 2004/0161641 A1 | 8/2004 | Lee et al. |
| 2005/0221975 A1 | 10/2005 | Renock et al. |
| 2005/0235776 A1* | 10/2005 | He et al. .......................... 75/255 |
| 2009/0030250 A1 | 1/2009 | Hill et al. |
| 2010/0267551 A1 | 10/2010 | Kotrel et al. |

FOREIGN PATENT DOCUMENTS

| WO | 2005 069893 | 8/2005 |
| WO | 2006 040159 | 4/2006 |
| WO | 2009 027171 | 3/2009 |
| WO | 2009 060019 | 5/2009 |

OTHER PUBLICATIONS

Gupta, S. et al., "Methanol-Tolerant Electrocatalysts for Oxygen Reduction in a Polymer Electrolyte Membrane Fuel Cell", Journal of Applied Electrochemistry, vol. 28, pp. 673-682, (1998).
Reeve, R. W. et al., "Methanol Tolerant Oxygen Reduction Catalysts Based on Transition Metal Sulfides", Journal of the Electrochemical Society, vol. 145, No. 10, pp. 3463-3471, (Oct. 1998).
Hogarth, M. P. et al., "Catalysis for Low Temperature Fuel Cells", Platinum Metals Rev., vol. 46, No. 4, pp. 146-164, (2002).
Dickinson, A. J. et al., "Preparation of a Pt—Ru/C Catalyst From Carbonyl Complexes for Fuel Cell Applications", Electrochimica Acta, vol. 47, pp. 3733-3739, (2002).
Liu, H. et al., "A Review of Anode Catalysis in The Direct Methanol Fuel Cell", Journal of Power Sources, vol. 155, pp. 95-110, (Feb. 10, 2006).
International Search Report issued Feb. 24, 2010 in PCT/EP09/060710 filed Aug. 19, 2009.
U.S. Appl. No. 13/375,805, filed Dec. 2, 2011, Schwab, et al.
U.S. Appl. No. 12/674,909, filed Feb. 24, 2010, Kotrel, et al.

* cited by examiner

Primary Examiner — Patricia L Hailey
(74) Attorney, Agent, or Firm — Oblon, Spivak, McClelland, Maier & Neustadt, L.L.P.

(57) ABSTRACT

The invention relates to a process for the continuous production of a catalyst comprising an alloy of a metal of the platinum group and at least a second metal as alloying metal selected from among the metals of the platinum group and the transition metals, in which a catalyst comprising the metal of the platinum group is mixed with at least one complex each comprising the alloying metal to give an alloy precursor and the alloy precursor is heated in a continuously operated furnace to produce the alloy.

20 Claims, No Drawings

PROCESS FOR THE CONTINUOUS PRODUCTION OF A CATALYST

This application is a 371 of PCT/EP2009/060710 filed Aug. 19, 2009. Priority to European patent application 08163000.6 filed Aug. 26, 2008, is claimed.

The invention relates to a process for the continuous production of a catalyst comprising an alloy of a metal of the platinum group and a second metal selected from among the metals of the platinum group and the transition metals.

Catalysts which comprise an alloy of a metal of the platinum group and a second metal are used, for example, in fuel cells. The catalyst is generally applied in the form of a catalytically active layer to an ion-conducting membrane. Such catalyst layers are usually applied to both sides of the membrane. The membrane provided with the catalyst layers is positioned between two porous gas diffusion layers. The respective reaction gases are brought close to the membrane via the gas diffusion layers. At the same time, the gas diffusion layer serves to supply and conduct away the electrons taken up or released by the reactants. The actual reduction or oxidation reaction takes place in the catalyst layer located between the membrane and the gas diffusion layer. The membrane in turn ensures ionic charge transport in the fuel cell. A further task of the membrane is to form a gastight barrier between the two electrodes.

The catalysts are suitable, for example, for use as cathode catalysts in fuel cells. This allows for an application in so called low temperature fuel cells, for example proton-exchange membrane fuel cells (PEMFCs), and in high temperature fuel cells, for example phosphoric acid fuel cells (PAFCs). For use in direct methanol fuel cells (DMFC) the cathode catalysts have to have a high tolerance to methanol besides a high current density for the oxygen reduction.

Heat-treated porphyrin-transition metal complexes as are known, for example, from J. Applied Electrochemistry (1998), pages 673-682, or transition metal sulfides, for example ReRuS or MoRuS systems as are known, for example, from J. Electrochem. Soc., 145 (10), 1998, pages 3463-3471, have, for example, a high current density for the reduction of oxygen and display good tolerance to methanol. However, these catalysts do not achieve the activity of Pt-based catalysts and are also not stable enough to ensure a satisfactory current density over a prolonged period of time in the acid medium of a fuel cell.

It is known from US-A 2004/0161641 that Pt catalysts which are alloyed with transition metals have a good tolerance to methanol and ensure a sufficiently high current density for the reduction of oxygen. Thus, it is known from US-A 2004/0161641 that, for example, an active methanol-tolerant cathode catalyst should have a very high binding energy for oxygen at the same time as a low binding energy for hydrogen. A high binding energy for oxygen ensures a high current density for the reduction of oxygen, while a low binding energy for hydrogen inhibits the electro oxidative dehydrogenation of methanol to carbon monoxide and thus increases the methanol tolerance. These properties are possessed, according to US-A 2004/0161641, by alloys of the elements Fe, Co, Ni, Rh, Pd, Pt, Cu, Ag, Au, Zn and Cd. However, a specific example of an alloy composition which is suitable as methanol-tolerant cathode catalyst is not given.

As an alternative to the use of a methanol-tolerant catalyst, the possibility of choosing a more suitable membrane in order to reduce the permeation of methanol is mentioned, for example, in Platinum Metals Rev. 2002, 46, (4). For example, thicker Nafion membranes can be used for this purpose. However, the reduced permeation of methanol at the same time leads to an increase in the membrane resistance, which ultimately leads to a drop in performance of the fuel cell.

The production of catalysts comprising platinum and ruthenium is described, for example, in A. J. Dickinson et al., "Preparation of a Pt—Ru/C Catalyst from carbonyl complexes for fuel cell applications", Elektrochimica Acta 47 (2002), pages 3733-3739. For this purpose, $[Ru_3(CO)_{12}]$ and $[Pt(CO)_2]_x$ and activated carbon are mixed with o-xylene. This mixture was heated at 143° C. under reflux for 24 hours with constant mechanical stirring. The mixture was subsequently cooled and the o-xylene was removed by distillation. The heating under reflux was carried out in an air atmosphere. The process described leads to a catalyst which is rich in ruthenium.

An overview of preparation techniques for producing Pt—Ru catalysts for use in direct methanol fuel cells is given by H. Liu et. al., "A review of anode catalysis in the direct methanol fuel cell", Journal of Power Sources, 155 (2006) pages 95-110. Suitable production methods described are firstly the impregnation of carbon supports with metal-comprising precursors, application of colloidal metal alloy particles to supports and the synthesis of finely divided metal particles in microemulsions. The application of colloidal metal alloy particles to supports and the synthesis of finely divided metal particles in microemulsions require the use of very expensive starting materials, e.g. surfactants. For this reason, the impregnation of carbon supports is most frequently used for producing catalysts. However, a disadvantage of impregnation is that it is generally difficult to control the size of the nanoparticles and their distribution. In addition, the use of high-boiling solvents, as is frequently the case in impregnation, is problematical, especially in the production of industrially relevant amounts of catalyst.

In a further known process, a platinum catalyst is firstly produced in a first step. This is filtered, washed and dried and then redispersed in a liquid reaction medium, generally water. The element to be alloyed in is added in the form of a suitable soluble salt to the dispersion and precipitated by means of a suitable precipitant, preferably sodium carbonate. The dispersion obtained is filtered, the solid which has been separated off is washed, dried and subsequently subjected to a high-temperature treatment under a reducing atmosphere. However, this process has the disadvantage that a product which has already been filtered, washed and dried once has to be subjected a second time to this sequence of processing steps.

It is therefore an object of the present invention to provide a process for producing a catalyst which does not have the disadvantages of the processes known from the prior art. In particular, it is an object of the present invention to provide a process by means of which a catalyst having a reproducible size of nanoparticles and distribution can be produced continuously.

This object is achieved by a process for the production of a catalyst comprising an alloy of a metal of the platinum group and at least a second metal as alloying metal selected from among the metals of the platinum group and the transition metals, which comprises the following steps:
  (a) mixing of a catalyst comprising the metal of the platinum group with at least one thermally decomposable compound each comprising an alloying metal to give an alloy precursor,
  (b) heating of the alloy precursor in a continuously operated furnace to produce the alloy.

The catalyst produced according to the invention is stable to acids and has a high current density for the reduction of oxygen, as is desired for cathode catalysts in fuel cells. In addition, the catalyst produced according to the invention is also very tolerant toward methanol contamination.

The catalyst comprising the metal of the platinum group is mixed with the at least one complex comprising the alloying metal in step (a), preferably to give a dry or moist powder. In this way, the necessity of having to subject the washed and dried catalyst comprising the metal of the platinum group to renewed filtration, washing and drying is avoided. Only the heating in step (b) in order to obtain the alloy follows.

As continuously operated furnace used for formation of the alloy, preference is given to using a rotary tube furnace or a belt calciner. Particularly when using a rotary tube furnace, the gaseous compounds formed during production of the alloy by decomposition of the complex can be removed, so that the production of relatively large quantities of catalyst is also possible.

The catalyst comprising the metal of the platinum group is in the form of, for example, metallic powder.

To achieve a sufficiently good catalyst activity, it is necessary for the catalyst to have a large specific surface area. This is preferably achieved by the catalyst comprising a support, with the alloy of the metal of the platinum group and the second metal being applied to the support. To achieve a large surface area, the support is preferably porous.

When the catalyst is applied to a support, individual particles of the catalyst material are generally comprised on the support surface. The catalyst is usually not present as a contiguous layer on the support surface.

To produce the catalyst comprising the support, it is preferred for the catalyst comprising the metal of the platinum group to comprise the support beforehand.

The support here is generally a catalytically inactive material to which the catalytically active material has been applied or which comprises the catalytically active material. Suitable catalytically inactive materials which can be used as supports are, for example, carbon or ceramics. Further suitable support materials are, for example, tin oxide, preferably semiconducting tin oxide, γ-aluminum oxide which may be carbon-coated, titanium dioxide, zirconium dioxide or silicon dioxide, with the latter preferably being present in finely divided form having a primary particle diameter of from 50 to 200 nm. Tungsten oxide and molybdenum oxide are also suitable and these can also be present as bronzes, i.e. as substoichiometric oxide. Further suitable supports are the carbides and nitrides of metals of transition groups IV to VII of the Periodic Table of the Elements, preferably of tungsten and of molybdenum.

However, carbon is particularly preferred as support material. An advantage of carbon as support material is that it is electrically conductive. When the catalyst is used as electrocatalyst in a fuel cell, for example as cathode of the fuel cell, it is necessary for it to be electrically conductive in order to ensure the function of the fuel cell. The carbon used as support can be present as, for example, activated carbon, carbon black, graphite or nanostructured carbon. Suitable carbon blacks are, for example, Vulcan XC72 or Ketjen black EC300. If the carbon is present as nanostructured carbon, preference is given to using carbon nanotubes. To produce the catalyst, the metal of the platinum group is applied to the support material.

When the catalyst comprising the metal of the platinum group further comprises a support, the metal of the platinum group is usually firstly deposited on the support. This is generally carried out in solution. It is possible, for example, for metal compounds to be present in solution in a solvent for this purpose. The metal can be present in covalent, ionic or complexed form. Furthermore, it is also possible for the metal to be deposited reductively, as precursor or by precipitation of the corresponding hydroxide by means of alkali. Further possibilities for deposition of the metal of the platinum group are impregnation with a solution comprising the metal (incipient wetness), chemical vapor deposition (CVD) or physical vapor deposition (PVD) processes and also all further processes known to those skilled in the art by means of which a metal can be deposited. Preference is given to firstly precipitating a salt of the metal of the platinum group. The precipitation is followed by drying and heat treatment to produce the catalyst comprising the metal of the platinum group.

The production of such supported or unsupported catalysts comprising a metal of the platinum group is known and corresponding catalysts can be procured commercially.

For the purposes of the invention, metals of the platinum group are rhodium, iridium, nickel, palladium, platinum, copper, silver and gold. In a preferred embodiment of the invention, however, the metal of the platinum group is platinum or palladium, very particularly preferably platinum.

When the catalyst comprising the metal of the platinum group which is used in step (a) is in unsupported form, the metal of the platinum group is preferably present as powder having a particle size in the range from 1 to 200 µm. In this case, the metal of the platinum group has primary particle sizes in the range from 2 to 20 nm. However, the powder of the metal of the platinum group can also comprise further, catalytically inactive constituents. These serve, for example, as release agents. Suitable materials for this purpose are, for example, all materials which can also be used as catalyst supports.

The at least one alloying metal which is comprised in the thermally decomposable compound, preferably a complex, in particular a metal-organic complex, and is selected from among the metals of the platinum group and the transition metals is preferably selected from the group consisting of ruthenium, cobalt, nickel and palladium.

The at least one alloying metal is preferably present as metal-organic complex. Preferred ligands for formation of the metal-organic complex are olefins, preferably dimethyloctadiene, aromatics, preferably pyridine, 2,4-pentanedione. Preference is also given to the at least one alloying metal being present in the form of a mixed cyclopentadienyl-carbonyl complex or as pure or mixed carbonyl, phosphane, cyano or isocyano complex.

Preference is given to the at least one alloying metal being present as metal-organic complex with acetylacetonate or 2,4-pentanedione as ligand. The at least one alloying metal is preferably present in ionic form.

To mix the at least one alloying metal selected from among the metals of the platinum group and the transition metals with the catalyst comprising the metal of the platinum group, it is preferred that the thermally decomposable compound comprising the alloying metal is present in dry form. However, as an alternative, it is also possible for the thermally decomposable compound to be present as a solution in a solvent. The solvent is in this case preferably selected from the group consisting of ethanol, hexane, cyclohexane, toluene and ether compounds. Preferred ether compounds are open-chain ethers, for example diethyl ether, di-n-propyl ether or 2-methoxypropane, and also cyclic ethers such as tetrahydrofuran or 1,4-dioxane.

If the thermally decomposable compound comprising the at least one alloying metal is present in solution in a solvent, the mixture of the catalyst comprising the metal of the platinum group and the at least one metal-organic compound or the at least one metal complex is dried before the heat treatment in step (b). Drying can be carried out at ambient temperature or at elevated temperature. If drying is carried out at elevated temperature, the temperature is preferably above the boiling point of the solvent. The drying time is selected so that the proportion of solvents in the mixture of the catalyst comprising the metal of the platinum group and the at least one complex after drying is less than 5% by weight, preferably less than 2% by weight.

The mixing of the catalyst comprising the metal of the platinum group and the at least one complex comprising the alloying metal is effected by any method known to those skilled in the art for the mixing of solids. Suitable solids mixers usually comprise a vessel in which the material to be mixed is moved. Suitable solids mixers are, for example, paddle mixers, screw mixers, hopper mixers or pneumatic mixers.

When the thermally decomposable compound is present in solution in a solvent, the mixture of the catalyst comprising the metal of the platinum group and the at least one dissolved complex is preferably produced by a customary dispersion process known to those skilled in the art. This is carried out using, for example, a vessel in which fast-rotating knives or blades are comprised. An example of such an apparatus is an Ultra-Turrax®.

However, it is particularly preferred that the catalyst comprising the metal of the platinum group is still free-flowing. This is generally the case when the catalyst has a residual moisture content of up to 50% by weight of water. If the catalyst shall not be used completely dried, the residual moisture content of the catalyst comprising the metal of the platinum group is preferably in the range from 20 to 30% by weight of water. As a result of the low water content, the mixture of the catalyst comprising the metal of the platinum group and the at least one complex comprising the alloying metal remains free-flowing. This is an essential prerequisite for satisfactory operation of, in particular, a rotary tube furnace used as continuously operated furnace. The residual moisture content of the catalyst comprising the metal of the platinum group is obtained, for example, by drying in air during production. However, it is also possible to use a completely dried catalyst.

To produce an alloy of the metal of the platinum group and the at least one alloying metal selected from among the metals of the platinum group and the transition metals, the powder produced in step (a) by mixing the catalyst comprising the metal of the platinum group with the at least one thermally decomposable compound comprising the alloying metal is heated. For this purpose, the mixture produced in step (a) is brought to a temperature in the range from 90 to 900° C., preferably in the range from 350 to 900° C., more preferably in the range from 400 to 850° C. and in particular in the range from 400 to 650° C., in a continuously operated furnace. As a result of heating, the at least one complex is decomposed and the metal bound therein is liberated. The metal combines with the metal of the platinum group. This forms an alloy in which disordered metal crystallites are present side by side. The individual metal crystallites generally have a size in the range from 2 to 7 nm.

In a preferred embodiment, heating is carried out in two temperature stages, with the temperature of the first temperature stage being lower than the temperature of the second temperature stage. It is also possible for heating to be carried out in more than two temperature stages. Here, preferably the temperature of the subsequent temperature stage is in each case higher than the temperature of the preceding temperature stage. However, preference is given to carrying out heating in two temperature stages.

When heating of the alloy precursor in step (b) is carried out in two temperature stages, preference is given to the temperature of the first temperature stage being in the range from 300 to 500° C., preferably in the range from 350 to 480° C. and in particular in the range from 370 to 460° C., and the temperature of the second temperature stage being in the range from 500 to 700° C., more preferably in the range from 550 to 680° C. and in particular in the range from 570 to 660° C. The temperature of the second temperature stage is preferably at least 100° C. higher, more preferably at least 150° C. higher, than the temperature of the first temperature stage.

The residence time in the continuously operated furnace in step (b) is preferably in the range from 30 minutes to 10 hours, more preferably in the range from 45 minutes to 5 hours and in particular in the range from 1 hour to 2 hours.

The heating of the alloy precursor in step (b) is preferably carried out under a reducing atmosphere. The reducing atmosphere preferably comprises hydrogen. The proportion of hydrogen depends on the composition of the catalyst to be produced. The proportion of hydrogen in the reducing atmosphere can be up to 100% by volume. Preference is given to using an $H_2/N_2$ gas atmosphere in which the concentration of hydrogen is usually less than 30% by volume, generally less than 20% by volume. The proportion of hydrogen in the reducing atmosphere is particularly preferably less than 10% by volume and in particular about 5% by volume. Particularly in the production of a Pt—Ni catalyst or of a Pt—Co catalyst, the proportion of hydrogen in the reducing atmosphere is preferably in the range from 4 to 10% by volume, in particular about 5% by volume.

Apart from hydrogen, the reducing atmosphere preferably comprises at least one inert gas. The reducing atmosphere preferably comprises nitrogen. However, as an alternative, it is also possible to use, for example, argon in place of the nitrogen. It is also possible to use a mixture of nitrogen and argon. However, preference is given to nitrogen.

It is particularly preferred for the reducing atmosphere not to comprise any further constituents in addition to the hydrogen and the inert gas. However, the presence of traces of further gases, for example due to the method of gas production, should not be ruled out.

After heating to form the alloy in step (b), a passivation is preferably carried out. For this purpose, the alloy produced is, for example, cooled to ambient temperature under an inert atmosphere. The inert atmosphere is preferably a nitrogen atmosphere or an argon atmosphere. It is also possible to use a mixture of nitrogen and argon. The alloy produced in step (b) can also be introduced, for example, into a charge of water in order to effect passivation after leaving the continuously operated furnace.

The catalyst produced by the process of the invention is suitable, for example, for use as electrode material in a fuel cell. Typical fuel cells in which the catalyst can be used are, for example, proton-exchange membrane fuel cells (PEMFCs), direct methanol fuel cells (DMFCs), direct ethanol fuel cells (DEFCs) and phosphoric acid fuel cells (PAFCs). The catalyst produced by the process of the invention is particularly suitable as cathode catalyst, i.e. a catalyst for the reduction of oxygen. Further suitable applicants are the electro oxidation of methanol or hydrogen even outside fuel cells, the electroreduction of oxygen, chloralkali electrolysis and the electrolysis of water. The catalyst produced by the process of the invention can also be used, for example, in automobile gas catalysis, for example as 3-way catalyst or diesel oxidation catalyst, or for catalytic hydrogenation or dehydrogenation in the chemical industry. Such hydrogenations/dehydrogenations include, for example, hydrogenations of unsaturated aliphatic, aromatic and heterocyclic compounds, dehydrogenation of carbonyl, nitrile, nitro groups and of carboxylic acids and esters thereof, aminative hydrogenations, hydrogenations of mineral oils and carbon monoxide. Examples of dehydrogenations are the dehydrogenation of parrafins, of naphthenes, of alkylaromatics and of alcohols. The hydrogenation or dehydrogenation can be carried out either in the gas phase or in the liquid phase.

EXAMPLES

Comparative Example 1

To produce a carbon-supported platinum catalyst, 100 g of a commercially available carbon black support (CABOT XC72) are dispersed in 4 l of water by means of an Ultra-Turrax® dispersing apparatus. 57.14 g of Pt(NO$_3$)$_2$ dissolved in 250 ml of H$_2$O are added to the suspension. 4250 ml of ethanol are then added to the mixture and the mixture is heated to boiling. The suspension is boiled under reflux for 5 hours, cooled to 60° C., filtered through filter paper on a Büchner funnel and the solid is washed with 10 l of cold H$_2$O to free it of NO$_3$.

The resulting carbon-supported platinum catalyst in the form of a moist washed filter cake is subsequently reslurried in 3 l of H$_2$O. The pH of the suspension is set to 2.1 by means of about 20 drops of 65% strength HNO$_3$. 48.86 g of Ni(NO$_3$)$_2$. 6H$_2$O dissolved in 400 ml of H$_2$O are added to the suspension. The mixture is subsequently mixed well for 10 minutes and the pH is increased to 8.5 by means of about 290 ml of 10% strength Na$_2$CO$_3$ solution. The suspension is stirred further at 75° C. and a pH of 8.5 for 1 hour. A 6.3% strength formaldehyde solution produced by dilution of 18 ml of 35% strength formaldehyde solution to 100 ml is subsequently added and the mixture is again stirred at 75° C. for 1 hour.

After the reaction is complete, the suspension is cooled to about 60° C. and the catalyst is filtered off with suction through a filter paper on a Büchner funnel and the solid is washed with 15 l of cold H$_2$O to free it of NO$_3$. The catalyst is subsequently dried for about 48 hours under a nitrogen atmosphere in a rotary tube furnace at a furnace temperature of 80° C.

To form the PtNi alloy, the product obtained is heated to 500° C. at a rate of 5° C./min in a hydrogen/argon atmosphere comprising 15% by volume of hydrogen, maintained at this temperature for 30 minutes and subsequently heated to 850° C., once again at a rate of 5° C./min, maintained at this temperature for another 30 minutes, subsequently cooled to room temperature and passivated in nitrogen to which air is added stepwise until an air atmosphere is present.

The platinum content of the catalyst produced in this way is 23.2% by weight, the nickel content is 6.8% by weight and the water content is less than 0.5% by weight. The PtNi crystallite size is 9.0 nm and the lattice constant is 3.810 Å.

Comparative Example 2

To produce a supported platinum catalyst, 75.8 g of a commercially available carbon black support (CABOT XC72) are dispersed in 3 l of water by means of an Ultra-Turrax® dispersing apparatus. 1 l of a 4% strength platinum nitrate solution are added to the solution. 4.25 l of ethanol are subsequently added and the mixture is refluxed for 5 hours. The catalyst dispersion obtained is filtered on a suction filter and the filter cake obtained is allowed to dry in air until it has a residual moisture content of 22% by weight. The dried filter cake is subsequently comminuted through a 0.4 mm sieve.

11.5 g of the carbon-supported platinum catalyst produced in this way are mixed with 4.47 g of nickel acetylacetonate and introduced into a rotary tube furnace which can be operated batchwise. The mixture is subsequently dried at 100° C. under a stream of nitrogen for 2 hours. The gas stream is subsequently changed to a stream of 0.8 l/h of hydrogen and 15 l/h of nitrogen and the mixture is heated stepwise to 600° C. The catalyst produced in this way is subsequently cooled and passivated by means of air/nitrogen at room temperature.

The catalyst produced has a platinum content of 21.6% by weight, a nickel content of 8.7% by weight and a water content of 0.5% by weight. The crystallite size of the PtNi crystallites is 2.4 nm and the lattice constant of the PtNi alloy is 3.742 Å.

Example

A carbon-supported platinum catalyst is produced as described in comparative example 2.

28.8 g of the carbon-supported platinum catalyst produced in this way are mixed with 11.2 g of nickel acetylacetonate and introduced into the reservoir of a rotary tube furnace which can be operated continuously. The rotary tube furnace has three heating zones, with the first heating zone being regulated at 400° C. and the second and third heating zones each being regulated at 600° C. The gas atmosphere in the rotary tube furnace is a mixture of 5% by volume of hydrogen in 95% by volume of nitrogen. The conveying speed of the rotary tube furnace is set so that 50 g/h of catalyst are transported through the rotary tube furnace. The residence time of the product in the heated zone of the rotary tube furnace is 1 hour.

After leaving the rotary tube furnace, the resulting product is collected in a receiver and subsequently passivated in a stream of air/nitrogen outside the rotary tube furnace.

The catalyst produced in this way has a platinum content of 17.8% by weight, a nickel content of 7.9% by weight and a water content of 0.6% by weight. The crystallite size of the PtNi crystallites is 2.4 nm and the lattice constant of the PtNi alloy is 3.762 Å.

The invention claimed is:

1. A process for continuous production of a catalyst comprising an alloy of a metal of the platinum group and at least one second metal as alloying metal selected from the group consisting of a metal of the platinum group and a transition metal, the process comprising:
   (a) mixing a catalyst precursor comprising a metal of the platinum group with at least one thermally decomposable compound each comprising the alloying metal to give an alloy precursor; and
   (b) heating the alloy precursor in a continuously operated furnace for from 45 minutes to 5 hours to produce the alloy comprised in the catalyst,
   wherein the heating is carried out in a first and a second temperature stage,
      with a temperature of the first temperature stage being lower than a temperature of the second temperature stage, and
      the temperature of the first temperature stage is in a range from 350 to 480° C., and
      the temperature of the second temperature stage is in a range from 550 to 680° C.

2. The process of claim 1, wherein the heating is carried out in a continuously operated furnace, which is a rotary tube furnace or a belt calciner.

3. The process of claim 2, wherein a residence time in the continuously operated furnace is in a range from 30 minutes to 10 hours.

4. The process of claim 1, wherein the heating in (b) is carried out under a reducing atmosphere.

5. The process of claim 4, wherein the reducing atmosphere comprises hydrogen.

6. The process of claim 4, wherein a proportion of hydrogen in the reducing atmosphere is less than 30% by volume.

7. The process of claim 1, wherein the temperature of the second temperature stage is at least 100° C. higher than the temperature of the first temperature stage.

8. The process of claim 1, wherein the catalyst precursor comprising the metal of the platinum group is present as metallic powder, or further comprises a support.

9. The process of claim 8, wherein the support is present and is a carbon support.

10. The process of claim 1, wherein the catalyst precursor comprising the metal of the platinum group has a residual moisture content of up to 50% by weight of water.

11. The process of claim 1, wherein the metal of the platinum group is platinum.

12. The process of claim 1, wherein the alloying metal is selected from the group consisting of ruthenium, cobalt, nickel, and palladium.

13. The process of claim 1, wherein the at least one thermally decomposable compound is a metal-organic compound or a metal complex.

14. The process of claim 13, wherein the at least one metal-organic compound or the at least one metal complex comprising the at least one alloying metal is present as powder or as a solution in a solvent.

15. The process of claim 1, wherein the at least one alloying metal is present
- as a metal complex with an olefin, an aromatic, or 2,4-pentanedione as ligand,
- as a mixed cyclopentadienyl-carbonyl complex, or
- as a pure or mixed carbonyl, phosphane, cyano, or isocyano complex.

16. The process of claim 15, wherein the at least one metal-organic compound or the at least one metal complex comprising the at least one alloying metal is present as powder or as a solution in a solvent.

17. The process of claim 15, wherein the at least one alloying metal is present as a metal complex with dimethyl octadiene or pyridine.

18. The process of claim 1, wherein the at least one alloying metal is present as a metal complex with acetylacetonate or 2,4-pentanedione as ligand.

19. The process of claim 18, wherein the at least one metal-organic compound or the at least one metal complex comprising the at least one alloying metal is present as powder or as a solution in a solvent.

20. The process of claim 1, further comprising:
passivating the catalyst comprising the alloy after the heating to form the alloy in (b).

* * * * *